United States Patent [19]

Heshmat

[11] Patent Number: 4,671,679

[45] Date of Patent: Jun. 9, 1987

[54] MAGNETIC FLUID DEVICES SUCH AS MAGNETIC FLUID BEARINGS, SEALS, AND THE LIKE AND AN AUTOMATIC MAGNETIC FLUID SUPPLY CONTROL SYSTEM THEREFOR

[75] Inventor: Hooshang Heshmat, Niskayuna

[73] Assignee: Mechanical Technology Incorporated, Latham, N.Y.

[21] Appl. No.: 859,412

[22] Filed: May 5, 1986

[51] Int. Cl.⁴ .................. F16C 33/82; F16C 33/72; F16J 15/40; B65D 53/06

[52] U.S. Cl. .................... 384/133; 277/17; 277/80; 277/135; 384/8; 384/100; 384/446

[58] Field of Search ............. 384/8, 100, 114, 121, 384/133, 322, 399, 400, 446; 277/3, 80, 135, 17, 21

[56] References Cited

U.S. PATENT DOCUMENTS

| | | | |
|---|---|---|---|
| 2,863,538 | 12/1958 | Jaeschke | 277/80 X |
| 3,708,215 | 1/1973 | Wilcock et al. | 384/102 |
| 3,746,407 | 7/1973 | Stiles et al. | 384/133 |
| 4,304,411 | 12/1981 | Wilcock et al. | 277/80 |
| 4,335,885 | 6/1982 | Heshmat | 277/80 X |
| 4,407,518 | 10/1983 | Moskowitz | 277/80 X |
| 4,527,802 | 7/1985 | Wilcock et al. | 277/80 X |
| 4,545,587 | 10/1985 | Higgins | 384/446 X |

Primary Examiner—Stuart S. Levy
Assistant Examiner—Thomas R. Hannon
Attorney, Agent, or Firm—Joseph V. Claeys; Charles W. Helzer

[57] ABSTRACT

Provides new magnetic fluid bearings and magnetic fluid seals incorporating a pressure responsive system for automatically controlling the supply of magnetic fluid to the magnetic fluid feed area of such bearing or seal. The system for controlling the supply of magnetic fluid includes a reservoir of magnetic fluid and a conduit leading from the reservoir to the magnetic fluid feed area of the magnetic fluid bearing or magnetic fluid seal. A portion of the conduit is subjected to a magnetic field which establishes a pressure responsive magnetic fluid plug in that portion of the conduit to automatically control the flow of magnetic fluid to and from the reservoir as a function of the difference in pressure between the magnetic fluid feed area of the bearing or seal and the reservoir.

35 Claims, 17 Drawing Figures

MAGNETIC FLUID DEVICES SUCH AS MAGNETIC FLUID BEARINGS, SEALS, AND THE LIKE AND AN AUTOMATIC MAGNETIC FLUID SUPPLY CONTROL SYSTEM THEREFOR

FIELD OF THE INVENTION

This invention relates to the field of magnetic fluid devices such as magnetic fluid seals, magnetic fluid bearings, and the like wherein a magnetic fluid is used in the device to effect sealing, bearing support, and the like.

More particularly, the present invention relates to such magnetic fluid devices and a system for automatically controlling the supply of magnetic fluid to the magnetic fluid feed area of such magnetic fluid devices. The invention has a wide range of applications with various configurations and arrangements of such magnetic fluid devices. It is especially useful and advantageous in connection with magnetic fluid bearings and magnetic fluid seals and will be particularly described in that connection.

BACKGROUND PRIOR ART PROBLEM

Loss of magnetic art fluid after a period of operation is one of the unresolved and very significant problems with conventional magnetic fluid devices, such as for example, magnetic fluid centrifugal seals of the type described in U.S. Pat. No. 4,304,411, issued Dec. 8, 1981 for a "Magnetic/Centrifugal Seal" in the name of Donald F. Wilcock and Martin W. Eusepi, which patent is assigned to Mechanical Technology Incorporated of Latham, N.Y. Replacement of lost fluid after a period of operating life, presents a substantial problem with such devices. Such loss of fluid may be due to evaporation, oxidation, or from just being "blown-out" as a result of a high pressure transient which exceeds the sealing or bearing load capacity of the device, or some similar phenomenon. This is a problem common to all known current designs of magnetic fluid bearings and seals.

The present invention overcomes this prior art problem and shortcoming of magnetic fluid bearings and seals in a very simple and reliable manner by providing a means for automatically controlling and maintaining the supply of magnetic fluid to the magnetic fluid feed area of the magnetic fluid bearing or seal. This system can be utilized to initially fill the magnetic fluid bearing or seal with magnetic fluid, as well as to automatically replace the magnetic fluid which has been lost during operation.

SUMMARY OF INVENTION

It is a primary object of this invention to provide a simple and reliable, pressure responsive system for automatically controlling the supply of magnetic fluid to the magnetic fluid feed area of magnetic fluid devices, such as magnetic fluid bearings and magnetic fluid seals.

Briefly stated in accordance with one aspect of the invention there is provided a flexible walled container fabricated from elastic material which serves as a reservoir for magnetic fluid. The elastic material provides for energy storage when the container is pressurized. The reservoir is supported adjacent a magnetic fluid using device, such as a magnetic fluid bearing or magnetic fluid seal, and includes a conduit, one end of which is connected with the magnetic fluid reservoir and the other end of which terminates at a selected region adjacent the magnetic fluid feed area of the bearing or seal. A portion of the conduit intermediate the ends thereof is subjected to a magnetic field such that the remainder of the length of the conduit extends in either direction beyond (out of) the magnetic field.

The magnetic fluid in the portion of the conduit acted upon by the magnetic field establishes a pressure responsive magnetic fluid "plug" or two-way magnetic fluid valve means in the conduit. In general, at the present time it appears that the maximum pressure differential, $\delta p$, the magnetic fluid plug or two-way valve means will withstand is about 4 psi gauge. By appropriate design any desired lower $\delta p$ may be provided for the magnetic fluid valve means comprised by the magnetic fluid trapped in the portion of the conduit subjected to the magnetic field. With the foregoing described arrangement, when the pressure in the magnetic fluid feed area of the magnetic fluid using device exceeds the pressure in the magnetic fluid reservoir by 4 psi (or other designed $\delta p$), magnetic fluid will flow through the conduit and into the reservoir from the magnetic fluid feed area. Conversely, when the pressure in the magnetic fluid reservoir exceeds the pressure in the magnetic fluid feed area by the same $\delta p$ (e.g. 4 psi), magnetic fluid will flow through the conduit from the reservoir and will be supplied to the magnetic fluid feed area of the magnetic fluid using device.

BRIEF DESCRIPTION OF DRAWINGS

These and other objects, features and many of the attendant advantages of this invention will be appreciated more readily as the same becomes better understood from a reading of the following detailed description, when considered in conjunction with the accompanying drawings, wherein the like parts in each of the several figures are identified by the same reference characters and wherein.

BEST MODES OF PRACTICING THE INVENTION

Figure 1:
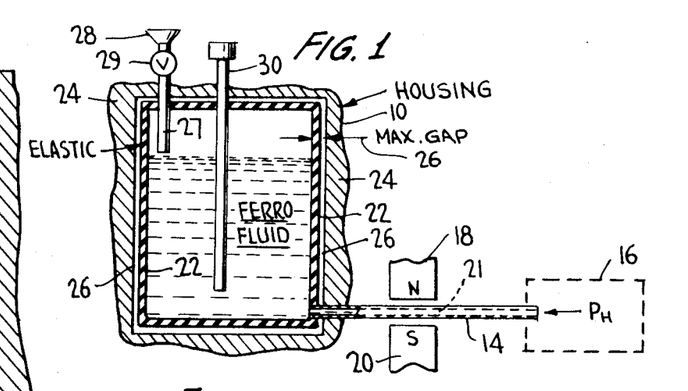
FIG. 1 is a schematic illustration of an automatic magnetic fluid supply control system according to the invention.

As illustrated schematically in FIG. 1, the automatic magnetic fluid supply control system according to this invention comprises a reservoir 10 for containing a supply of magnetic fluid 12. A conduit 14 has one end connected with reservoir 10 and the other end terminates at a selected region of a magnetic fluid using device shown by the broken line box 16, which may be the magnetic fluid feed area of a magnetic fluid seal or a magnetic fluid bearing. A portion of conduit 14 intermediate the ends thereof is subjected to a suitable magnetic field having a direction substantially perpendicular to the longitudinal axis of such portion of the conduit 14. For example, this can be accomplished, as illustrated in FIG. 1, by having a portion of conduit 14 pass between the opposed pole pieces 18 and 20 of a suitable magnet means, such as a permanent magnet. Alternatively, a portion of the conduit may be passed thorugh the magnetic circuit of the magnetic fluid bearing or magnetic fluid seal.

The action of the magnetic field on the magnetic fluid within the portion of the conduit 14 establishes a magnetic fluid "plug" 21 which will withstand a predetermined pressure. At the present time it appears that such magnetic fluid "plug" will withstand a maximum pressure of about 4 psi gauge. By appropriate design any desired lower pressure withstanding capacity can be provided.

With the foregoing described arrangement when the pressure in the region of the magnetic fluid using device, for example, the magnetic fluid feed area of the magnetic fluid bearing or seal, exceeds the pressure in the reservoir 10 by 4 psi (or other designed pressure withstanding capacity), magnetic fluid will flow through the conduit 14 into the reservoir. Conversely, when the pressure in the reservoir 10 exceeds the pressure in the magnetic fluid feed area of the magnetic fluid bearing or seal by the same pressure difference (e.g. 4 psi), magnetic fluid will flow through conduit 14 from the reservoir and into the magnetic fluid feed area. Thus, the magnetic fluid "plug" functions as a pressure responsive two-way magnetic fluid valve.

Preferably, as illustrated in FIG. 1, reservior 10 comprises an inner container 22 which holds the magnetic fluid 12 and is fabricated from a suitable elastic or flexible material capable of storing energy when stressed, such as, for example, when the inner container 22 is pressurized.

The inner container 22 is preferably disposed within an outer support housing 24. A small space 26 is provided between the outside surface of inner container 22 and the inside surface of support housing 24. The space 26 should preferably be within the expansion tolerance of the inner container 22, usually in the order of about one mil (0.001 inch).

Conduit 14 may be constructed of any suitable material which is permeable to magnetic lines of flux. Preferably, conduit 14 is fabricated from a material having high magnetic permeability, such as low carbon steel or the like.

Reservoir 10 may also be provided with means for filling the inner container 22 with magnetic fluid. This is illustrated in FIG. 1 as a filler pipe 27 which extends from the top of the inner container 22. Filler pipe 27 may be provided with a funnel-shaped head 28 to facilitate the introduction of magnetic fluid. Filler pipe 27 may also be provided with a suitable shut-off valve 29, which would be opened to introduce magnetic fluid into inner container 22 of reservoir 10 and closed during operation to allow inner container 22 to be pressurized. Reservoir 10 may also be provided with a suitable means for determining the level of the magnetic fluid in the reservoir, such as a dip stick 30.

Figures 2, 2A:
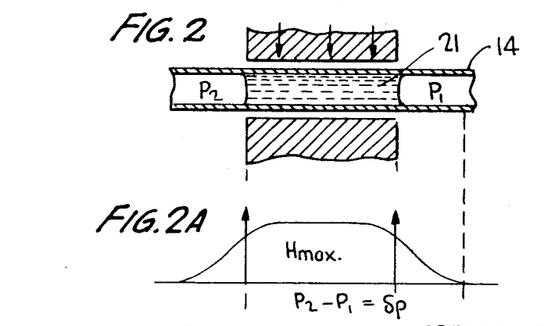
FIG. 2 is a partial schematic view of the system illustrating the portion of the conduit passing through a magnetic field.
FIGS. 2A and 2B are characteristic curves showing the effect of the quantity of magnetic fluid in the conduit on the pressure withstanding capacity of the magnetic fluid valve.
Figure 2B:
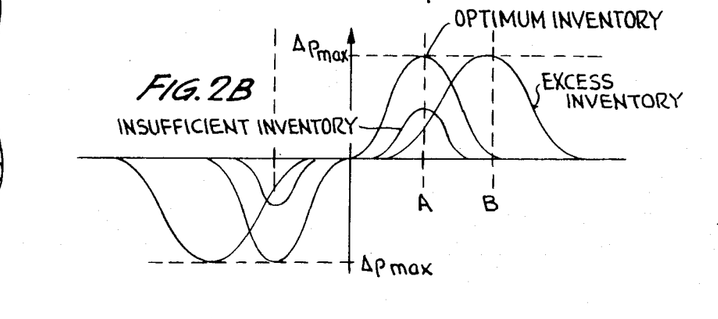

The effect of the quantity of magnetic fluid in the conduit on the magnetized fluid "plug" that serves as a two-way magnetic fluid valve means for automatically controlling flow of magnetic fluid into and out of the magnetic fluid reservoir 10 is best shown in FIG. 2 of the drawing, considered in conjunction with FIG. 2A and FIG. 2B. The magnetic fluid valve means by design will withstand a predetermined maximum differential pressure $\delta p$ across it. This differential pressure $\delta p$ depends upon a number of parameters, such as the cross-sectional area and relative length of the conduit 14, quantity of magnetic fluid, and more importantly the strength of the magnetic field acting on the magnetic fluid within the portion of the conduit subjected thereto as shown in FIG. 2A. By design, it is possible to tailor $\delta p$ by varying the magnetic field strength, the size of conduit 14, or the relative length of the magnetic fluid subjected to such magnetic field. There is an optimum ratio of conduit size (i.e. cross-sectional area) to its length, but it depends upon the $\delta p$ capacity of the magnetized fluid plug which the designer desires. The area of the conduit 14 is substantially independent of its overall length but depends to some extent upon the magnetic field intensity H max as depicted in FIG. 2A. The larger the area of conduit 14, the weaker the field intensity and thus the smaller $\delta p$ which can be withstood by the magnetized fluid plug. While there is generally no limitation on the overall horizontal length of the conduit 14, there is a practical limit on the vertical drop occurring over its length, since the hydraulic head would limit the pressure withstanding capacity of the magnetic fluid valve. Accordingly, the conduit length and positioning should be tailored to meet the requirements of a particular application with these factors in mind.

FIG. 2B illustrates the effect of optimum, excess, and insufficient inventory of magnetic fluid in the portion of conduit 14 subjected to the magnetic field. Inventory as used herein refers to the amount of the magnetic fluid in the portion of the conduit within the magnetic field. As shown in FIG. 2B, if the magnetic fluid in conduit 14 extends to point B referenced to FIG. 2 and the magnetic field is interrupted at A, the length of the magnetic fluid plug is maximum and $\delta p = \delta p$ max. In the design of a particular system, this should be kept in mind. The conduit 14 must extend some distance beyond the edge of the applied magnetic field so as to be properly operative and obtain the $\delta p$ max operating characteristics for the magnetic fluid valve. In FIG. 2B the insufficient inventory condition refers to having less magnetic fluid than that of the portion of the tube 24 within the magnetic field, and as shown clearly results in a less than optimum prssure differential withstanding capacity by the resultant magnetic fluid valve.

Figure 3:
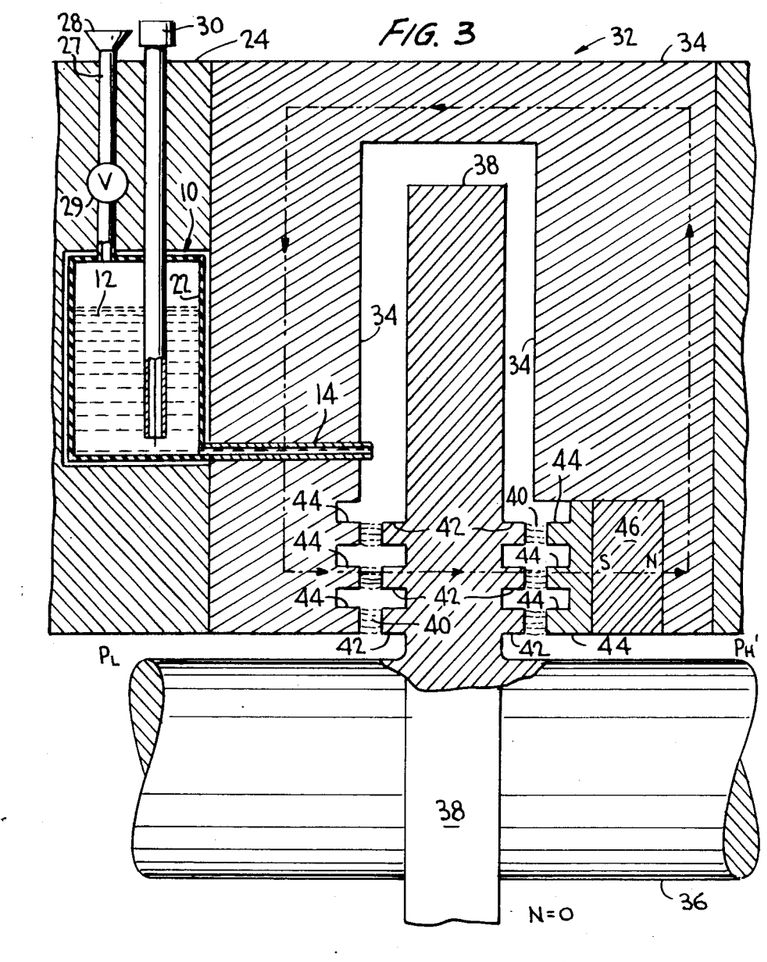
FIGS. 3, 3A, 3B, 3C and 3D comprise partial sectional views illustrating the invention in combination with a magnetic/centrifugal fluid seal device for five different operating modes under different operating conditions of the seal.

FIG. 3 illustrates a magnetic/centrifugal fluid seal incorporating the automatic magnetic fluid supply control system constructed according to the invention. As shown, the magnetic/centrifugal fluid seal comprises an outer housing 32 having a first portion 34 provided with a cavity 35 and fabricated from ferromagnetic material, such as iron. A member, shown as a shaft 36, is movably supported within the housing 32 by suitable bearings (not shown). A circular vane 38 is secured to and moves with shaft 36 and extends into the cavity 35. A plurality of tooth-like projections or pole pieces 42 are formed in concentric spaced-apart rings about the periphery of vane 38 near the end thereof adjacent the shaft 36. Corresponding sets of tooth-like projections or pole pieces 44 are also formed on the inner surface of cavity 35 near the end thereof adjacent the shaft 36. The confronting surfaces of pole pieces 42 and 44 define the gap means 40.

A permanent magnet 46 in the form of an annular ring surrounding the shaft 36 is secured between at least one of the sets of pole pieces 44 and the first housing portion 34. In the resulting arrangement permanent magnet 46, the first housing portion 34, pole pieces 42 and 44 and the gap means 40 therebetween, and the vane 38 are all included and comprise part of a closed magnetic circuit. The coaction between the pole pieces 42 formed on vane 38 with the pole pieces 44 formed on the inner surface of cavity 35 of first housing portion 34 serves to concentrate the lines of magnetic flux through the gap means 40 defined by the confronting surfaces of the pole pieces 42 and 44.

In the embodiment of the invention shown in FIG. 3, under the conditions indicated wherein the shaft is at standstill (N=0) and a higher pressure condition PH is present on the righ-hand side of the device as viewed by the reader and lower pressure condition PL is to the left, the gap means 40 between the relatively movable pole pieces 42 and 44 would be filled with magnetic fluid as shown. The magnetic fluid may comprise any known commercially available magnetic fluid composed of a carrier liquid which contains a ferric suspension. Other fluids such as hydrocarbon suspended in a liquid carrier also may be used. For a more detailed description of the desired characteristics of the magnetic fluid 12, reference is made to the above-noted U.S. Pat. No. 4,304,411.

Figure 3A:
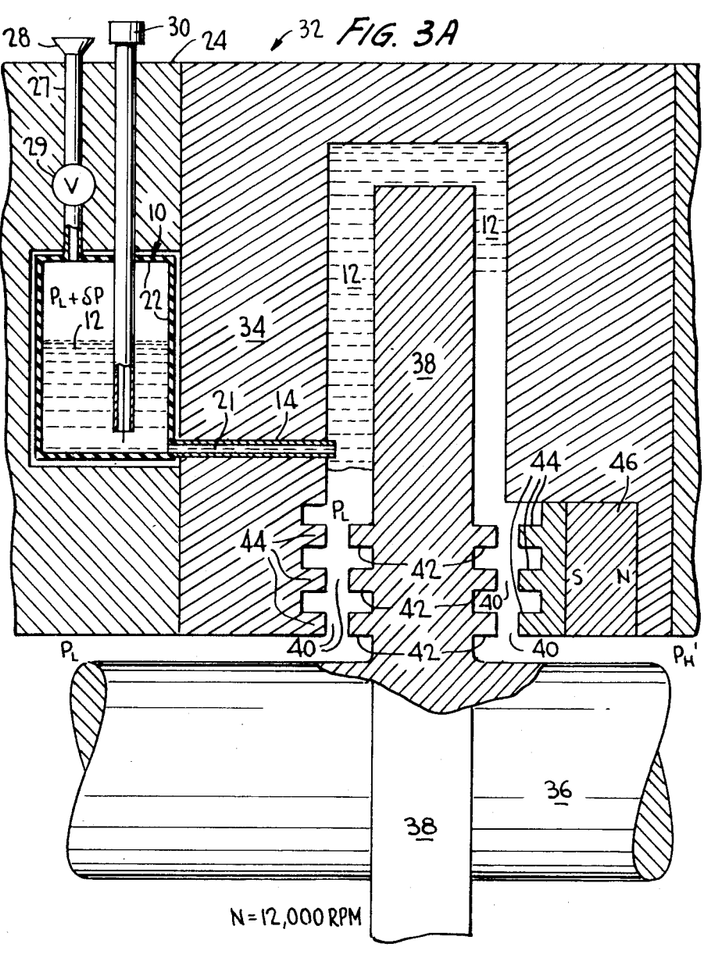

As noted earlier, FIG. 3 depicts a magnetic/centrifugal fluid seal and the novel automatic magnetic fluid supply control system under conditions where the rotatable vane 38 is at standstill (N=0). FIG. 3A shows the seal at an operational condition where the rotor speed is just above transition speed, i.e. N−12,000 rpm. In this case PH−PL=ΔP is the centrifugal seal load capacity for the given speed of rotation N. Under these conditions, the magnetic fluid 12 previously retained in the gap means 40 now has been thrown out by the centrifugal action and is disposed in the centrifugal seal region surrounding the outer circumferential edge of the rotatable vane 38. In this operating mode, upon attaining equilibrium condition, the magnetic fluid contained within the reservoir 10 will be at a pressure PL+δp.

Figure 3B:
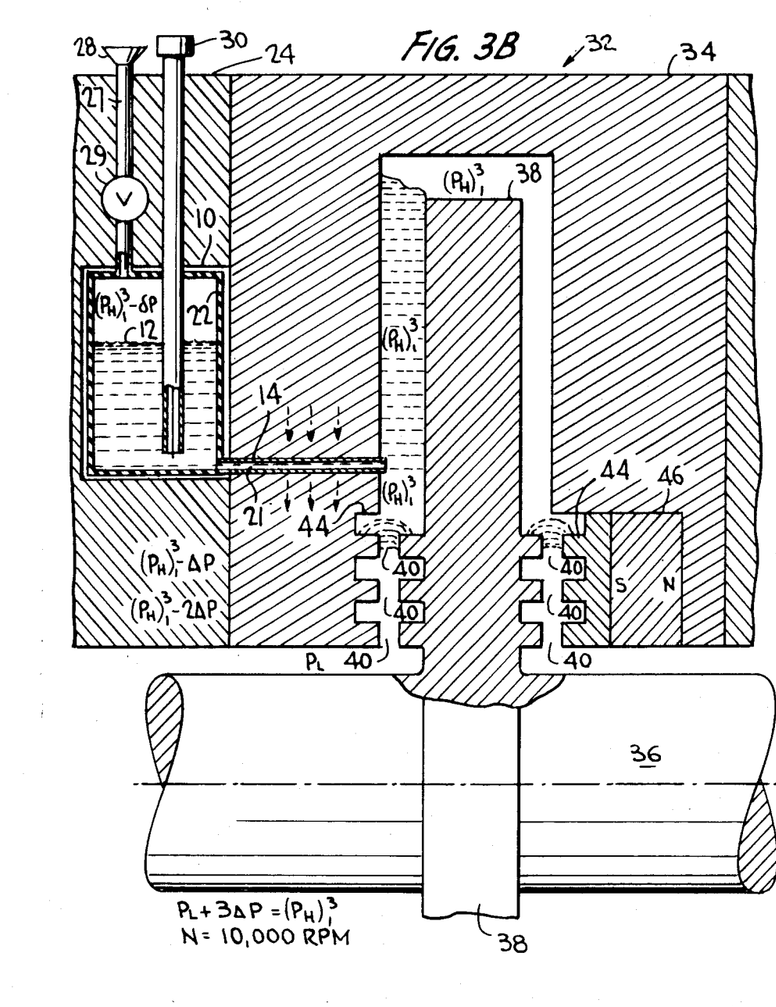

FIG. 3B illustrates the commencement of the shutting down condition, specifially the reverse transition point, say at about N=10,000 rpm for a given ΔP across the seal (i.e. PH−PL). At this point, fluid on the high pressure (PH) side flows through the conduit into the reservoir due to the previously existing high centrifugal pressure before filling the magnetic sealing gap means 40. This is due to the differential radii of the pole pieces 42 and 44 which require different fluid levels. This transitional condition continues until it balances Δp across the conduit 14 at which point the ΔP across the seal will be equal to $\Delta P = (PH)^3 - PL$.

Figure 3C:
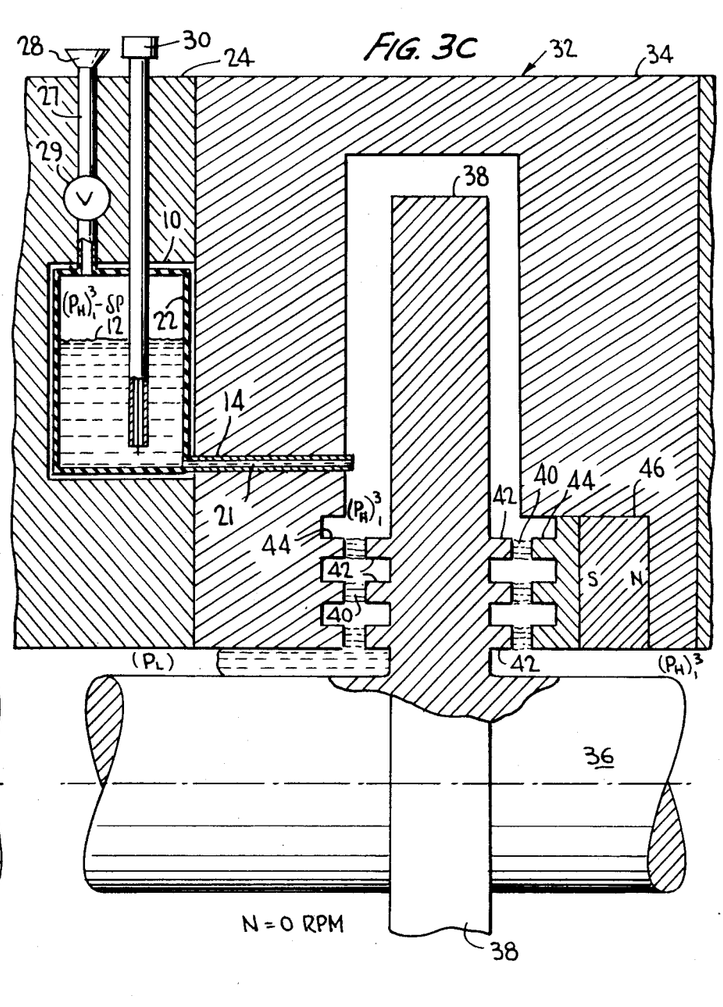

FIG. 3C of the drawings shows the condition of the system immediately after the rotatable vane 38 has been brought to a standstill (N=0). Under this condition a stable and balanced pressure is established across both the seal formed by the magnetic fluid trapped within the magnetic gap means 40 and by the magnetized fluid trapped in the portion of conduit 14 subjected to the magnetic field. Under these conditions, the pressure in the reservoir 10 obtains the value $(PH)^3 - \delta p$.

Figure 3D:
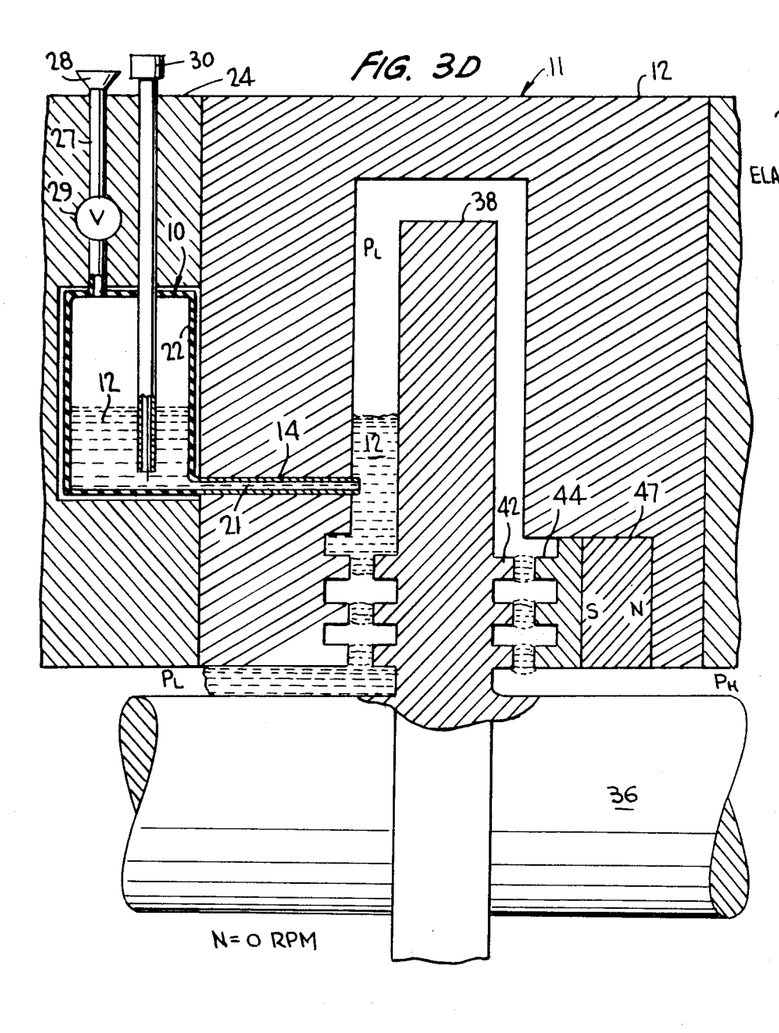

FIG. 3D of the drawings illustrates the special case where the differential pressure δP across the seal during shut-down conditions is 0 (i.e. the same pressure PL exists on both sides of the seal) and the shaft is at standstill (N=0 rpm). Under these conditions, the magnetized fluid plug in the portion of conduit 14 subjected to the magnetic field will allow the magnetic fluid in both the reservoir 10 and in housing 34 on the left-hand side of the vane 38 to seek the same level and will prevent total leaking of the fluid from the reservoir. The pressure in the reservoir under this condition is PL−δp.

Figure 4:
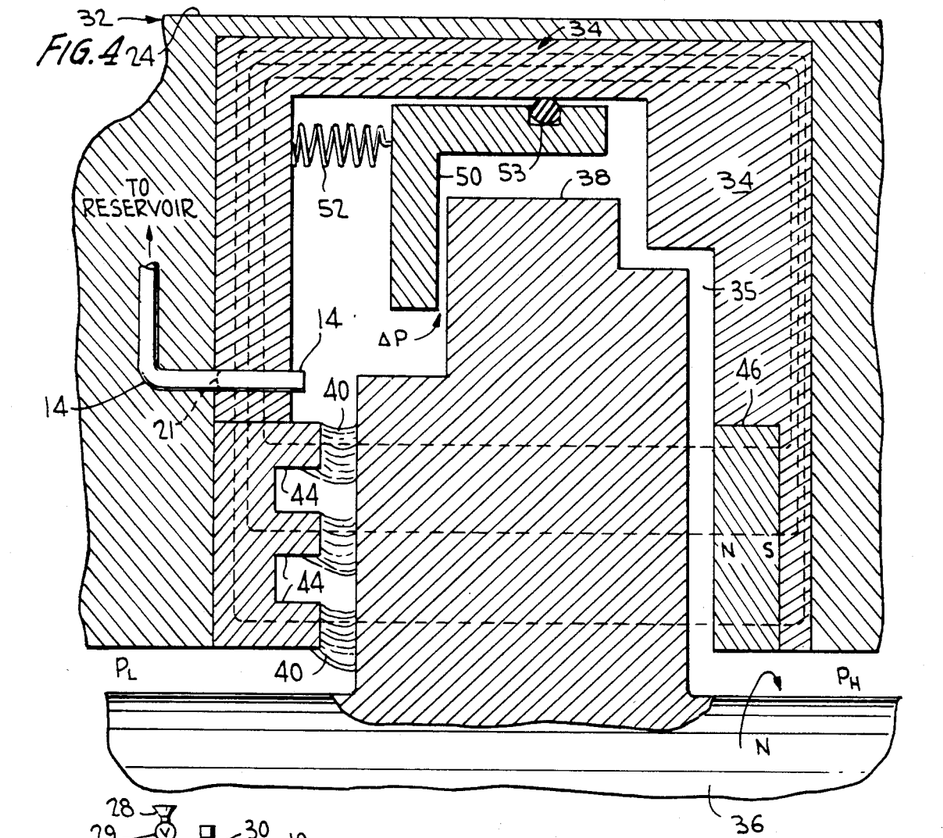
FIG. 4 is a partial sectional view of the invention incorporated with a magnetic fluid seal of the type which does not also include a centrifugal seal capacity.

FIG. 4 is a sectional view of a different embodiment of the invention which forms a pure magnetic fluid seal and does not include a centrifugal sealing stage in contrast to the FIGS. 3–3D arrangement described earlier. In FIG. 4, a relatively thick annular vane 38 is secured to and rotatable on a shaft 36 within an outer housing 32. The outer housing 32 includes a ferromagnetic first portion 34 which defines a cavity 35 within which the vane 38 is disposed. The first housing portion 34 has a plurality of tooth-like pole pieces 44 formed on the left-hand surface thereof opposing a flat planar side surface of the vane 38 and spaced apart from the side surface of vane 38 so as to define a plurality of magnetic gap means 40 which form a plural stage magnetic fluid seal. A permanent magnet 46 is secured in the first housing portion 34 opposite the remaining flat side surface of the annular vane 38 so that the permanent magnet 46, first housing portion 34, pole pieces 44, magnetic gap 40, vane 38 and the gap between the right-hand side surface of vane 38 and permanent magnet 46 from a closed magnetic circuit. Magnetic fluid 12 is maintained in the gap means 40 defined between the projecting ends of the tooth-like pole pieces 44 and the opposing left-hand flat side surfaces of vane 38.

A conduit 14, which may be of low carbon steel or glass is secured within a second housing portion and connects to a magnetic fluid reservoir (not shown in FIG. 4, but similar to that described in relation to FIG. 3). Part of the conduit 14 is designed to pass through the magnetic field of the closed magnetic circuit formed by the first housing portion 34 with conduit 14 substantially at right angles to the magnetic lines of flux of the magnetic field. Conduit 14 contains magnetic fluid so that a magnetized fluid plug 21 or two-way magnetic fluid valve is established by the magnetic fluid in the portion of conduit 14 which is subjected to the magnetic field similar to that described with relation to FIGS. 1 and 3.

The magnetic fluid seal shown in FIG. 4 is completed by a slidable, annular face seal member 50 having an L-shaped cross section which is maintained in position within the cavity defined within first housing portion 34. Face seal member 50 is supported with a downwardly depending leg portion in confronting relationship to the upper side surface portion of the thick vane 38 shown on the left-hand side of FIG. 4. The upper side surface portion of vane 38 is stepped inwardly from the lower side surface portion thereof which confronts the tooth-like projections or pole pieces 44 to form the magnetic gaps 40. A plurality of preloading compression tension springs 52 serve to maintain the annular face seal member 50 in this position and an O-ring seal 53 about the outer periphery of member 50 is provided to prevent flow-by of magnetic fluid between the outer circumference of face seal member 50 and the inner circumferential surface of the cavity 35 in first housing portion 34 within which the vane 38 rotates.

In operation, the seal shown in FIG. 4 is subjected to two different pressure conditions such as the low pressure condition PL on the left-hand side shown in FIG. 4 and a high pressure condition PH on the right-hand side. The magnetic fluid 12 contained in the magnetic gas 40 between the projecting pole pieces 44 and the confronting lower side surfaces of vane 38 on the left-hand side is always retained in place within the gaps 40 whether the shaft 36 is at standstill or rotating at its designed top operating speed, which normally will be under 10,000 rpm. Under these conditions, it is not expected that magnetic fluid will flow into the magnetic fluid reservoir 10 via the conduit 14. In this arrangement, the magnetic fluid valve will function only when there is an increase of fluid pressure in the magnetic fluid reservoir in excess of the designed differential pressure δp required to open the magnetic fluid valve formed by the magnetized plug in the portion of the conduit subjected to the magnetic field. It should be noted that the conduit 14 opens into a space in the cavity 35 within which vane 38 rotates which is at the higher pressure condition PH. Consequently, the pressure in the magnetic fluid reservoir 10 will be at PH + δp under conditions where the shaft 36 and vane 38 are at standstill. During operation where the vane 38 is rotated, a differential pressure drop ΔP will be produced in the small gap separating the end side surface of the vane 38 from the annular face seal member 50 which is sufficient to allow magnetic fluid to be delivered out of the end of the conduit 14 and into the magnetic gap 40 to replenish the magnetic fluid when necessary.

Figure 5:
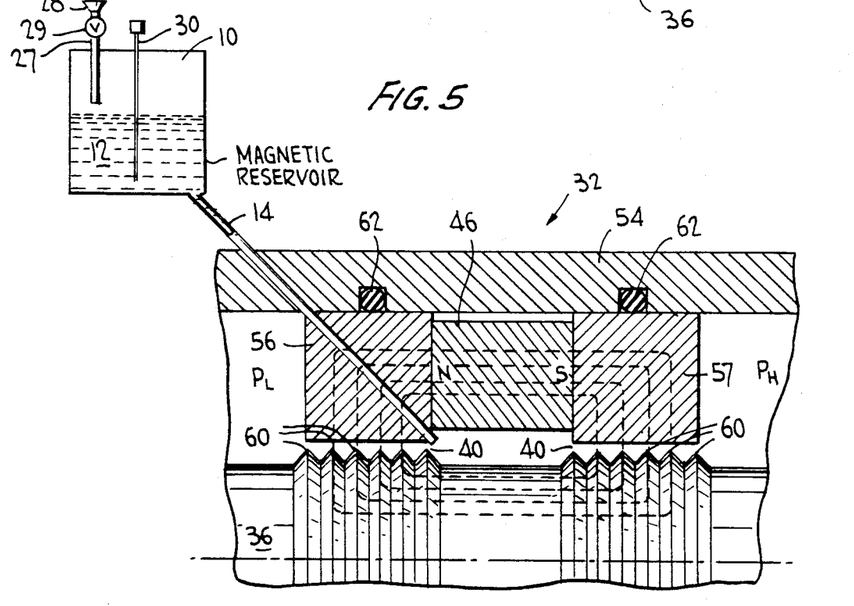
FIG. 5 is a partial sectional view of a magentic fluid radial seal having an automatic magnetic fluid supply system and constructed according to the invention.

FIG. 5 is a longitudinal sectional view of a magnetic fluid radial seal having an automatic magnetic fluid supply control system constructed according to the invention. In FIG. 5, the outer housing comparable to outer housing 32 of FIGS. 3 and 4 is comprised by a cylindrical tubular outer housing member 54 within which a shaft 36 is rotatably supported by journal bearings (not shown). Disposed within the outer cylindrical housing member 54 are a set of spaced-apart annular ring pole blocks 56 and 57 which are formed from ferromagnetic material such as soft iron. An annular permanent ring magnet 46, also formed of ferromagnetic material, is disposed between the pole blocks 56 and 57. Ring magnet 46 in conjunction with the two pole blocks 56 and 57 and the portion of shaft 36 disposed opposite the pole blocks 56 and 57 form a closed magnetic circuit. The portions of the shaft 36 which are disposed opposite the confronting inner flat surfaces of the annular ring pole blocks 56 and 57, respectively, have a series of annular, triangular shaped, tooth-like projections 60 formed thereon, the spaced-apart ends of which define magnetic gaps 40.

A reservoir 10 for containing a supply of magnetic fluid 12 is provided which is similar in construction to that described with relation to FIG. 1 of the drawings and which includes a filler pipe 27 with funnel-shaped head 28, shut-off valve 29, and a dip stick 30. The magnetic fluid reservoir 10 is connected through a conduit 14 to the magnetic fluid feed area for the magnetic gaps 40 defined between the ends of the tooth-like annular projections 60 on shaft 36 and the inner flat opposing surface of the respective ring pole blocks 56 and 57. A portion of the conduit 14 crosses the magnetic field of the closed magnetic circuit of which ring pole block 56 comprises a part at substantially right angles to the magnetic lines of flux passing through the ring pole block 56. Consequently, a magnetized magnetic fluid plug or two-way magnetic fluid valve is formed within that portion of conduit 14 that crosses the magnetic field within pole block 56 as explained earlier with respect to FIGS. 3 and 4 of the drawings.

During operation, the magnetic fluid 12 which is fed from reservoir 10 into the gap areas 40 of the radial bearing shown in FIG. 5, establishes multi-stage seals between the inner surfaces of the two annular pole blocks 56 and 57 and the opposed tooth-like projections 60 on shaft 36. The multi-stage seals prevents ingress of a higher pressure atmosphere PH shown on the right into lower pressure atmosphere PL on the left of the seal device as is known in the art. A set of O-ring seals 62 are provided between the inner circumferential surface of the outer cylindrical housing 54 which forms a second housing portion, and the outer cylindrical surfaces of the annular ring pole blocks 56 and 57 which together comprise a first inner housing portion. For a more detailed description of the operation of magnetic fluid seals, reference is made to U.S. Pat. No. 2,863,538—issued Dec. 9, 1958 for a "Permanent Magnetic Seal"; U.S. Pat. No 3,746,407—issued July 17, 1973 for a "Ferro-Hydrodynamic Low Friction Bearing"; and to an article entitled "Magnetic Fluid Seal" appearing in Machine Design magazine, Mar. 28, 1968 issue, pages 146-150, for example.

Figure 6:
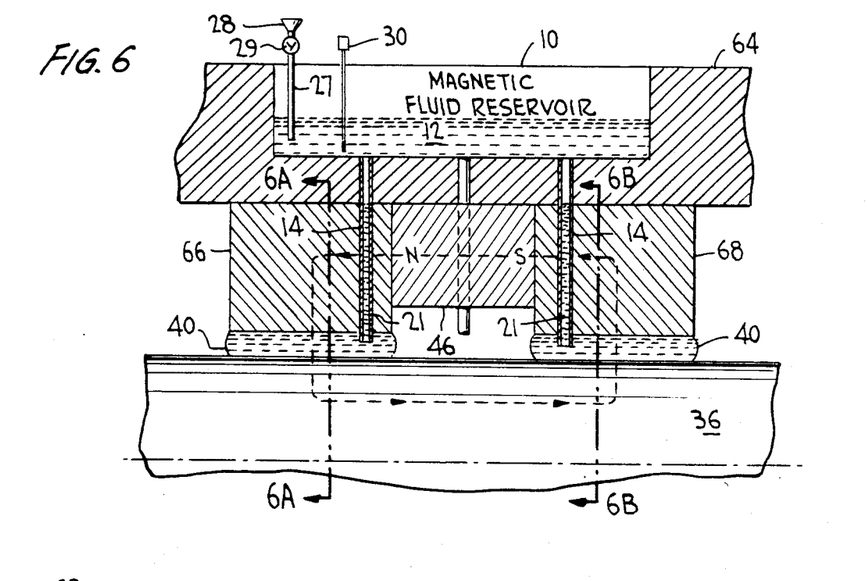
FIG. 6 is a partial sectional view of a magnetic fluid bearing comprising an automatic magnetic fluid supply control system and constructed according to the invention.

FIG. 6 is a longitudinal sectional view of a magnetic fluid bearing having an automatic fluid supply control system constructed according to the invention. In FIG. 6, an outer cylindrically-shaped tubular housing is shown at 64. A reservoir 10 for containing a supply of magnetic fluid 12 is formed in housing 64. A set of spaced-apart, ferromagnetic, annular pole blocks are shown at 66 and 68 which have their outer peripheral circumferential surfaces secured to the inner circumferential surfaces of the outer housing 64. The inner circumferential surfaces of the annular pole blocks 66 and 68 are spaced apart from and confront the outer surface of a ferromagnetic shaft 36 which is rotatably supported within outer housing 64 by the magnetic fluid bearing structure of FIG. 6. An annular permanent magnet 46 is secured between the spaced-apart annular pole blocks 66 and 68. The permanent magnet 46 in conjunction with the annular pole blocks 66 and 68 and the portion of shaft 36 extending between the two pole blocks form a closed magnetic circuit which also includes the gaps 40 between the spaced apart inner circumferential surfaces of the annular pole blocks 66 and 68 and the confronting opposed outer circumferential surface of shaft 36.

Magnetic fluid 12 from magnetic fluid reservoir 10 formed in outer housing 64 is supplied to the gaps 40 through conduits 14, a portion of each of which crosses through and intercepts the magnetic field of the closed magnetic circuit so that respective magnetized magnetic fluid plugs comprising two-way magnetic fluid valves are formed in each of the respective conduits 14.

Figures 6A, 6B:
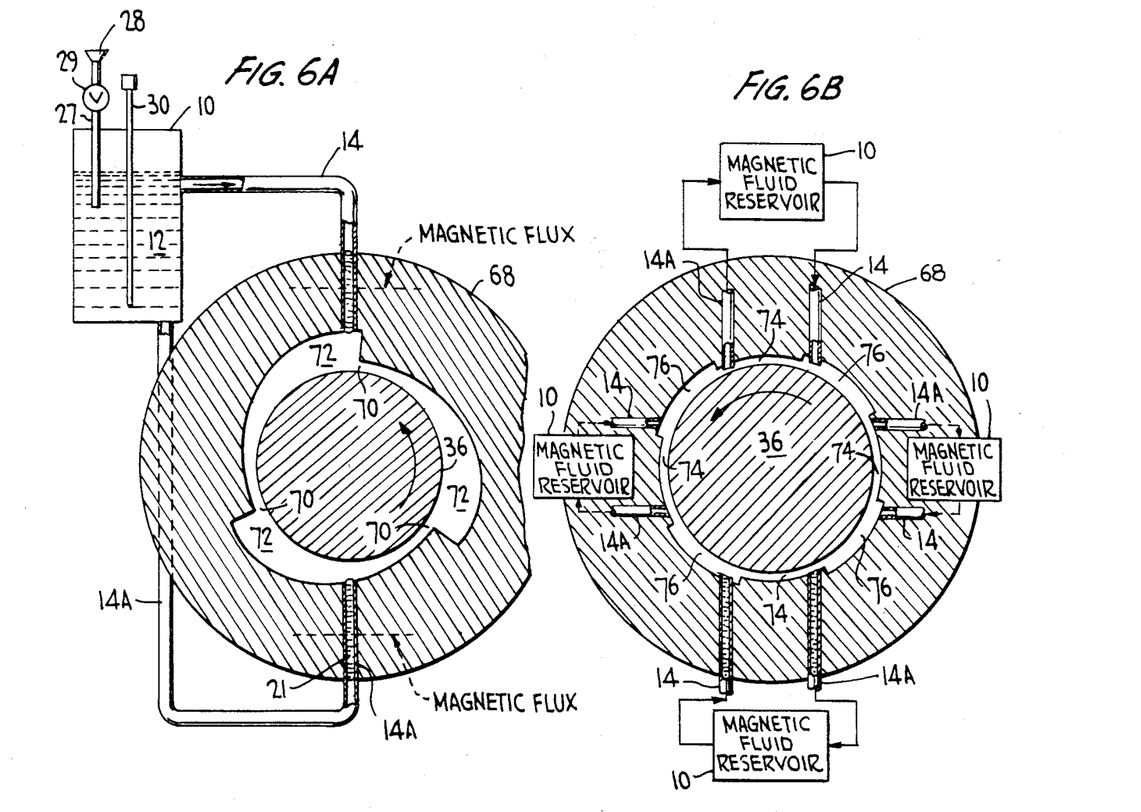
FIGS. 6A and 6B are cross-sectional views taken through plane A—A of FIG. 6 showing two different types of circumferential bearing surfaces formed on the bearing housing of the bearing arrangement shown in FIG. 6.

FIG. 6A is a cross sectional view taken through plane A—A of FIG. 6. In FIG. 6A it is seen that the rotatable shaft 26 has a smooth cylindrical outer surface but that the opposed confronting bearing support surfaces of the respective annular bearing blocks 66 and 68 are specially shaped to form hydrodynamic fluid film pumping means for building up hydrodynamic fluid film support for the shaft 36. The hydrodynamic fluid film pumping means formed in the inner circumferential surface of the annular bearing blocks 66 and 68 are shaped to provide a plurality of circumferentially extending multi-lobe gaps providing a plurality of gradually increasing gap spacing regions between the rotatable shaft outer surface and the opposed confronting bearing support surfaces of the bearing blocks 66 and 68. The gradually increasing gap spacing regions extend continuously between a plurality of minimum gap spacing areas shown at 70 circumferentially spaced apart around the shaft and terminating in a plurality of maximum gap spacing areas 72 which are immediately adjacent the next circumferentially occurring minimum gap spacing area 70.

In this embodiment of the invention, two conduits 14 and 14A are provided between the magnetic fluid reservoir 10 and the gap regions. Each of conduits 14 and 14A cross the magnetic field produced by the closed magnetic circuit described above with relation to FIG. 6 at substantially right angles to the magnetic lines of flux. Consequently, magnetic fluid plugs forming two-way magnetic fluid valves are established in each of the conduits 14 and 14A. It should be noted, however, that conduit 14 terminates in a maximum gap area 72 while the conduit 14A terminates in a minimum gap area 70.

During operation, with the shaft 36 rotating in the direction of the large arrow shown in FIG. 6A, a hydrodynamic load bearing magnetic fluid film will be built up within the entire varying width gap region including the minimum gap areas 70 and the maximum gap areas 72. The magnetic fluid pressure of the hydrodynamic fluid film built up in the narrow gap area 70 however will be considerably greater than the pressure of the magnetic fluid in the maximum gap regions 72. Consequently, magnetic fluid 12 will flow through the upper conduit 14 into minimum pressure, larger gap areas 72 and will be pumped due to the increased pressure from the smaller minimum gap areas 70 through the lower conduit 14A into the magnetic fluid reservoir 10 as indicated by the flow arrows under conditions where the amount of magnetic fluid contained within the gap region 72 of the bearing tends to become excessive. In this manner, the magnetic fluid for the bearing surfaces is continuously replenished and replaced as needed and an equilibrium condition is attained whereby safe and reliable operation of the bearing is achieved.

It should be noted that the above-described hydrodynamic load bearing fluid film is built up only after the shaft 36 exceeds a minimum transitional speed. Below the minimum speed it is the magnetic fluid maintained in the gap region 40 by the magnetic field forces which provides the fluid film support to shaft 36 within the bearing gap regions 40 and out of contact with the surrounding inner surface of the bearing blocks 66 and 68.

FIG. 6B is a cross sectional view of an alternative embodiment to the magnetic fluid bearing arrangement shown in FIG. 6A. In FIG. 6B the fluid film pumping means formed in the opposed confronting bearing support surfaces of annular bearing blocks 66 and 68 are shaped to provide a plurality of circumferentially extending narrow gap regions 74 interspersed between a plurality of wide gap regions 76. This provides a hybrid hydrodynamic-hydrostatic step bearing support for the rotatable shaft 36 extending completely around its circumference during high speed rotation of the shaft 36. During low speed rotation and at standstill, the magnetic field acting on the magnetic fluid in both the wide gap regions 76 and the narow gap regions 74 are adequate to support the shaft out of contact with the bearing support surface on the inner circumferential surfaces of bearing blocks 66 and 68.

As shown more clearly in FIG. 6B, in the FIG. 6 embodiment of the invention, a plurality of four different magnetic fluid reservoirs 10 are provided to assure an adequate flow of magnetic fluid into both the narrow gap regions 74 and the wide gap regions 76. The reservoirs 10 are interconnected to the wide gap regions via the conduit 14. Conduit 14 crosses the magnetic field of the closed magnetic circuit in which annular bearing block 68 is included at substantially a right angle. In a similar manner the return conduit 14A which interconnects the narrow gap regions 74 with the magnetic fluid reservoirs also crosses the magnetic field at substantially a right angle. Consequently, magnetized fluid plugs are established in the respective conduits 14 and 14A to control flow of the magnetic fluid into and out of the magnetic fluid reservoirs and to and from the respective wide gap regions 76 and the narrow gap regions 74.

During operation, upon rotation of the shaft 36 to its design rotational speed in the direction of the arrow shown, hydrostatic fluid bearing support will be built up in the wide gap regions of the fluid film pumping means formed around the inner annular surfaces of the bearing blocks 66 and 68. Concurrently, hydrodynamic fluid film support for the shaft will be built up in the narrow gap regions 74. For a more detailed description of the nature of the hydrostatic and hydrodynamic fluid film bearing supports which are developed by bearings of this type, reference is made to U.S. Pat. No. 3,708,215 issued Jan. 2, 1973 in the names of Donald F. Wilcock and Leo W. Winn and assigned to Mechanical Technology Incorporated of Latham, New York. Below a transitional speed where there is insufficient hydrodynamic fluid film pressure built up in the narrow gap regions to pressurize the wide gap regions sufficiently to provide hydrostatic bearing support, the shaft 36 will be maintained properly disposed within the bearing faces of the annular bearing blocks 66 and 68 by the magnetic fluid film support established by the magnetic field in which the magnetic fluid film is retained as shown in the sectional view of the bearing illustrated in FIG. 6.

Figure 7:
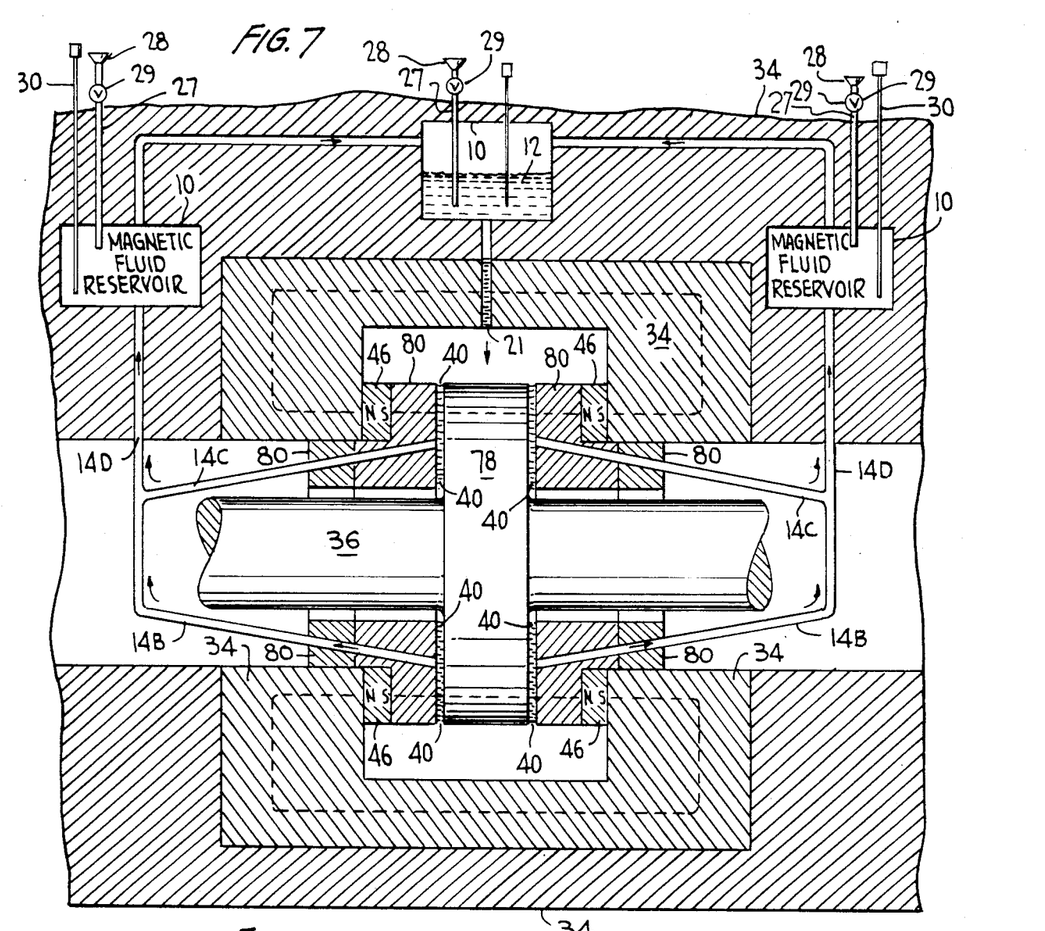
FIG. 7 is a partial sectional view of a magnetic fluid thrust bearing having an automatic magnetic fluid supply control system constructed according to the invention.

FIG. 7 is a longitudinal sectional view of a magnetic fluid film thrust bearing having automatic magnetic fluid supply control system constructed according to the invention. In FIG. 7, a movable member comprising a rotating shaft 36 is rotatably supported within an outer housing 32 by suitable journal bearing (not shown) such as those described with respect to FIG. 6. Shaft 36 has an annular collar secured around its circumference. The annular collar 78 is fabricated from ferromagnetic material and has smooth thrust bearing side surfaces. A set of two spaced-apart annular-shaped thrust face members 80 are provided, one on each side of collar 78 with each of the face members having an L-shaped cross section. The L-shaped annular face members 80 are physically disposed with their flat surfaces opposing the flat side surfaces of annular collar 78 and are spaced apart therefrom so as to define magnetic gaps 40. The thrust bearing face members 80 are secured to an inner, first housing member 34 also fabricated of ferromagnetic material, such as soft iron. Permanent magnets 46 in the form of rings are inserted between the legs of the L-shaped cross section thrust bearing face members 80 which define fixed thrust bearing surfaces on either side of annular collar 78 and an internal surface of the inner, first housing member 34 which has an overall shape of an automobile tire with an inverted U-shaped cross section. The annular member 78, the fixed thrust bearing face members 80, the permanent magnets 46 and the inner first housing member 34 in conjunction with the magnetic gaps 40 form a closed magnetic circuit which entraps and holds magnetic fluid in the gaps.

Magnetic fluid 12 is supplied from a magnetic fluid reservoir 10 formed in the outer housing member 32. The magnetic fluid 12 is supplied through a conduit 14 which crosses the magnetic field of the closed magnetic circuit at substantially right angles to the magnetic lines of flux. As a result, a magnetized fluid plug which functions as a two-way magnetic fluid valve is formed in the conduit 14 in the manner described earlier.

Figure 7A:
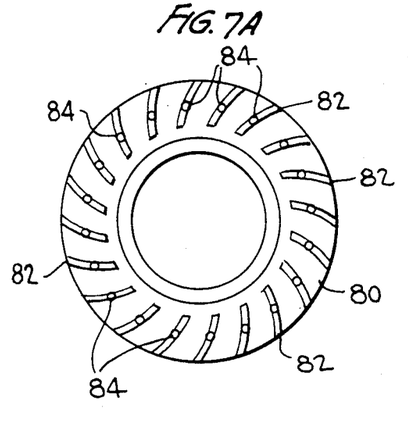
FIGS. 7A and 7B are cross-sectional views taken through planes A—A of FIG. 7 showing two different forms of magnetic fluid bearings comprising a hydrodynamic magnetic fluid bearing configuration and a hydrodynamic-hydrostatic magnetic fluid bearing arrangement, respectively.

FIG. 7a is a cross sectional view taken through plane A—A of FIG. 7 showing one embodiment of the thrust bearing surfaces formed in the opposing faces of the annular face members 80 which confront the side surfaces of annular collar 78. As shown in FIG. 7A the thrust bearing surfaces have a series of spiral grooves 82 formed in the surfaces thereof in an annular ring about the circumference of the thrust bearing face members 40 and are provided with openings 84 therein. These spiral grooves coact with the opposing flat thrust bearing surfaces on the sides of the annular collar 78 to form a hydrodynamic fluid support film during high speed rotation of shaft 36 which supports the collar 78 along its axial dimension in either direction. The magnetic fluid 12 retained in the gaps 40 by the magnetic field force produced thereacross supports the shaft along its longitudinal axis in either direction while the shaft is at standstill and at low rotating speeds below the transition point where hydrodynamic pumping forces are sufficient to build up the hydrodynamic fluid film. For a more detailed description of this phenomenon reference again is made to U.S. Pat. No. 3,708,215 noted previously.

During high speed rotation of the shaft 36, the hydrodynamic pumping action described above produces a sufficient pressure on the magnetic fluid 12 to cause a flow of the magnetic fluid out through the openings 84 formed in the spiral grooves 82 which flow is directed through the conduits 14B, 14C and 14D into the magnetic fluid reservoir 10. This flow of magnetic fluid caused by the hydrodynamic pumping action, serves to pressurize the magnetic fluid reservoir 10 in the manner described earlier with relation to FIG. 1 of the drawings. Consequently, upon the shaft 36 being slowed down through its transitional speed, the energy stored in the elastic walls of the reservoir will act as a "one-shot" pump to discharge an adequate supply of magnetic fluid to the gaps 40 to assure a reliable magnetic film bearing surface while the shaft speed is being reduced to standstill.

Figure 7B:
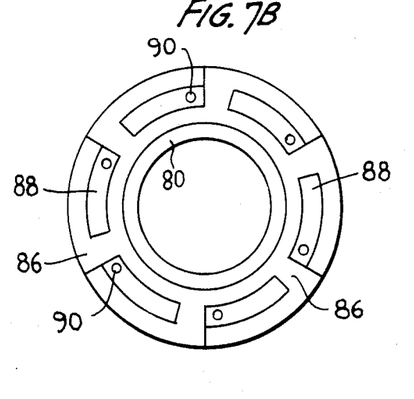

FIG. 7B of the drawings is a cross-sectional view again taken through plane A—A of FIG. 7 and shows an alternative embodiment of a magnetic fluid thrust bearing device having an automatic magnetic fluid supply control system according to the invention. In this embodiment of the invention the flat thrust bearing surfaces formed on the fixed annular face members 80 are provided with a plurality of alternate stepped land surfaces 86 and grooved pocket surfaces 88 formed in a ring around the surface of the face members 80 whch coact with the opposing flat side surfaces of annular collar 78. The structure shown in FIG. 7B forms a hybrid hydrodynamic-hydrostatic fluid film thrust bearing which uses the magnetic fluid during high speed rotation to build up alternate hydrostatic and hydrodynamic fluid films that provide thrust bearing support to the opposed flat side surfaces of the collar 78. A series of openings 90 are provided at the ends of the grooved pocket surfaces which bleed off the magnetic fluid and supply it to the magnetic fluid reservoir 10 via the conduits 14B, 14C and 14D for pressurizing the magnetic fluid in the reservoir as described earlier with respect to the FIG. 7A embodiment of the invention. For a more detailed description of the operation of the hybrid hydrodynamic-hydrostatic fluid film bearing, reference is again made to the above-noted U.S. Pat. No. 3,708,215.

INDUSTRIAL APPLICABILITY

From the foregoing description, it will be appreciated that the invention provides an automatic magnetic fluid supply control system and improved magnetic fluid using devices such as magnetic fluid seals, magnetic/centrifugal fluid seals, magnetic fluid bearings, magnetic fluid thrust bearings, and the like wherein the devices are provided with such automatic magnetic fluid supply control system for replenishing and automatically maintaining a safe level of magnetic fluid in the devices.

Having described the automatic magnetic fluid control system and several embodiments of magnetic fluid using devices incorporating such magnetic fluid control system constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

I claim:

1. A system for automatically controlling the supply of magnetic fluid to the magnetic fluid feed area of magnetic fluid using devices, comprising:
   (a) a closed reservoir for containing a supply of magnetic fluid;
   (b) a conduit having one end communicating with the magnetic fluid in said reservoir and the other end terminating at a selected region adjacent the magnetic fluid feed area of said magnetic fluid using device; and
   (c) means for subjecting a selected portion of said conduit intermediate the ends thereof to a magnetic field operative to establish with the magnetic fluid in said portion a pressure responsive magnetic fluid valve means having a predetermined maximum pressure withstanding capacity whereby flow of magnetic fluid into and out of said reservoir through said conduit is automatically controlled as a function of the difference in pressure between the magnetic fluid feed area and said reservoir.

2. The system according to claim 1, wherein said conduit is constructed of a material having high magnetic permeability.

3. The system according to claim 1, wherein said magnetic field is in a direction substantially perpendicular to the longitduinal axis of the portion of the conduit subjected to said magnetic field.

4. The system according to claim 1, wherein said resevoir is pressurizable.

5. The system according to claim 4, wherein said reservoir comprises an expandable, magnetic fluid container of elastic material surrounded by an outer housing.

6. The system according to claim 5, wherein said conduit is constructed of a material which is permeable to magnetic lines of flux, has a relatively small cross sectional area in comparison to its length, and said other end of said conduit extends a preselected distance beyond the portion thereof which is acted on by said magnetic field.

7. The system according to claim 4, wherein said conduit is constructed of a material having high magnetic permeability.

8. the system according to claim 7, wherein said magnetic field is in a direction substantially perpendicular to the longitudinal axis of the portion of the conduit subjected to said magnetic field.

9. The system according to claim 4, wherein said reservoir comprises a magnetic fluid container having flexible, energy storing wall means.

10. The system according to claim 9, wherein said conduit is ocnstructed of a material having high magnetic permeability.

11. The system according to claim 10, wherein said magnetic field is in a direction substantially perpendicular to the longitudinal axis of the portion of the conduit subjected to said magnetic field.

12. The system according to claim 9, wherein said conduit is constructed of a material having high magnetic permeability and said magnetic field is in a direction substantially perpendicular to the longitudinal axis of the portion of the conduit acted on by said magnetic field.

13. A magnetic fluid system, comprising:
(a) a magnetic fluid using device comprising at least two relatively movable members having confronting surfaces, gap means separating said confronting surfaces, means for establishing a magnetic circuit including said gap means, and a magnetic fluid feed area adjacent said gap means;
(b) a closed reservoir for containing a supply of magnetic fluid;
(c) a conduit having one end communicating with the magnetic fluid in said reservoir and the other end terminating at a selected region adjacent the magnetic fluid feed area of said magnetic fluid using device; and
(d) means for subjecting a selected portion of said conduit intermediate the ends thereof to a magnetic field operative to establish with the magnetic fluid therein a pressure responsive magnetic fluid valve means having a predetermined maximum pressure withstanding capacity whereby flow of magnetic fluid into and out of said reservoir through said conduit is automatically controlled as a function of the difference in pressure between the magnetic fluid feed area and said reservoir.

14. A magnetic fluid system according to claim 13, wherein the conduit leading from the reservoir is permeable to magnetic lines of flux, has a relatively small cross sectional area in comparision to its length, has a portion intermediate its ends disposed in the magnetic circuit and the remainder of which extends for a finite distance beyond the magnetic circuit whereby an optimum length segment of magnetic fluid contained in said portion of the conduit is acted upon by the magnetic field of the magnetic circuit to form the magnetic fluid valve means capable of withstanding a maximum differential pressure.

15. A magnetic fluid system according to claim 13, wherein the magnetic fluid using device comprises a magnetic seal wherein magnetic fluid rapped in the gap means between the relatively movable members is capable of withstanding a differential pressure $\Delta P$ applied across the gap means for sealing off atmospheres on each side of the gap means maintained at different pressures $PH - PL = \Delta P$.

16. A magnetic fluid system according to claim 13, wherein the magnetic fluid using device comprises a magnetic/centrifugal fluid seal, one movable member comprises a rotatble member rotatably supported within the first housing portion which completely surrounds the rotatable member and forms a centrifugal sealing area about the outer periphery of the rotatable member, and the gap means is defined between opposing surfaces of the rotatable member and the surrounding first housing portion whereby at standstill and low rotating speeds, a magnetic fluid seal is formed in the gap means and at high rotational speeds above a transitional speed, a centrifugal seal is formed in the centrifugal seal space of the device by magnetic fluid thrown by centrifugal force into and filling the space.

17. A magnetic fluid system according to claim 13, wherein said magnetic fluid using device comprises an outer housing having first and second portions and further including a dip stick and a refill pipe disposed on the second housing portion and extending into the reservoir, an on-off valve means in said refill pipe operative when open to allow for replenishing the magnetic fluid in the reservoir and when closed to allow the reservoir to achieve its closed condition, said dip stick being provided for measuring the level of the magnetic fluid in the reservoir.

18. A magnetic fluid system according to claim 17, wherein the gap means between said relativley movable members is comprised by spaced-apart coacting ferromagnetic pole pieces for concentrating magnetic lines of flux in said gap means.

19. A magnetic fluid system according to claim 18, wherein the magnetic fluid usng device comprises a magnetic fluid seal wherein magnetic fluid trapped in the gap means beween the relatively movable members is capable of withstanding differential pressure $\Delta P$ applied across the gap means for sealing off atmospheres on each side of the gap maintained at different pressures $PH - PL = \Delta P$.

20. A magnetic fluid system according to claim 19, wherein the magnetic fluid using device comprises a magnetic/centrifugal seal, one movable emmber comprises a rotatable member rotatably supported within the first housing portion which completely surrounds the rotatable member and forms a centrifugal sealing area about the outer periphery of the rotatable member, and the gap means is defined between opposing surfaces of the rotatable member and the surrounding first housing portion whereby at standstill and low rotating speeds, a magnetic fluid seal is formed in the gap means and at high rotational speeds above a transitional speed, a centrifugal seal is formed in the centrifugal seal space of the device by magnetic fluid thrown by centrifugal force into and filling the space.

21. A magnetic fluid system according to claim 20, wherein the rotatble member comprises a shaft having a vane secured to and rotating with said shaft, said shaft being journalled in said outer housing which includes the first and second housing portions, and wherein the vane is fabricated from ferromagnetic materials and the planar side surfaces of said vane in conjunction with the first housing portion define the gap means.

22. A magnetic fluid system according to claim 21, wherein the pole pieces comprise magnetizable teeth arrayed in annular rings around both planar surfaces of the vane and opposing sets of coacting magnetizable teeth annularly arrayed around the surrounding periphery of the first housing portion to define plural sets of coacting magnetic gaps that comprises a multi-stage magnetic fluid seal at standstill and low rotational speeds of the shaft and wherein the first housing portion incudes a centrifugal seal region peripherally surrounding the outer rim of the vane whereby at high operating speeds magnetic fluid is thrown into the centrifugal seal space by centrifugal force and simultaneously will be pumped into the magnetic fluid reservoir through said conduit upon the pressure exceeding the predetermined differential pressure $\Delta p$ of the magnetic fluid valve means to pressurize the reservoir and condition it to act as a one-shot pump for replenishing the magnetic fluid seal gaps with magnetic fluid upon the speed of the shaft and vane being reduced through a transitional speed range to low rotating speeds or standstill.

23. A magnetic fluid system according to claim 19, wherein the magnetic fluid using device comprises a magnetic fluid radial seal, one relatively movable member comprises a rotatable shaft fabricated from ferromagnetic material and having raised tooth-like projections formed around the periphery thereof in parallel annular bands, said tooth-like projections on the shaft being spaced-apart from confronting pole pieces supported on the first housing portion to form the gap means in which the magnetic fluid is trapped during operation of the magnetic fluid seal.

24. A magnetic fluid system according to claim 18, wherein the magnetic fluid using device comprises a magnetic fluid bearing in which one of the relatively movable members is a rotatable shaft and the other relatively movable member comprises the first housing portion the confronting surfaces of which are specially shaped to form hydrodynamic fluid film pumping means for building up hydrodynamic fluid film shaft support with the magnetic fluid in the space between the confronting surfaces of the rotatable shaft and the first housing portion during high speed rotation of the shaft, and wherein during low rotational speeds and at standstill physical support of the shaft is provided by the magnetic fluid filling the gap means defined between the rotatable shaft and the confronting surfaces of the first housing portion.

25. A magnetic fluid system according to claim 24, wherein the hydrodynamic fluid film pumping means formed in the confronting surfaces of the first housing portion are shaped to provide a plurality of circumferentially extending multi-lobe gaps providing a plurality of gradually increasing gap spacing regions between the rotatable shaft surfaces and the confronting surfaces of the first housing portion, said gradually increasing gap spacing regions continuously extending between a plurality of minimum gap spacing regions circumferentially spaced-apart around the shaft and terminating in a plurality of maximum gap spacing regions immediately adjacent the next circumferentially spaced-apart minimum gap spacing region, and wherein there are two separate partially magnetized conduits extending from the magnetic fluid containing reservoir with one conduit extending to a narrow gap spacing region, and the other conduit extending to a maximum gap spacing region.

26. A magnetic fluid system according to claim 24, wherein the fluid film pumping means formed in the confronting surfaces of the first housing portion are shaped to provide a plurality of circumferentially extending narrow gap regions interspersed between a plurality of wide gap regions to provide a hybrid hydrodynamic-hydrostatic step bearing support for the rotatable shaft extending around its circumference during high speed rotation of the shaft.

27. The magnetic fluid system according to claim 13, wherein said magnetic fluid using device comprises an outer housing having first and second portions, one of said movable member is supported within said first housing portion, and said reservoir is formed by an expandable closed container of elastic material supported within a cavity formed in said second housing portion.

28. The magnetic fluid system according to claim 27, wherein the gap between said relatively movable members is comprised by spaced-apart coacting ferromagnetic pole pieces for concentrating magnetic lines of flux in said gap.

29. A magnetic fluid system according to claim 27, wherein the magnetic fluid using device comprises a magnetic fluid radial seal, one relatively movable member comprises a rotatable shaft fabricated from ferromagnetic material and having raised tooth-like projections formed around the periphery thereof in parallel annular bands, said tooth-like projections on the shaft being spaced-apart from confronting pole pieces supported on the first housing portion to form the gap means in which the magnetic fluid is trapped during operation of the magnetic fluid seal.

30. A magnetic fluid device according to cliam 13, wherein the magnetic fluid using device comprises a magnetic fluid bearing in which one relatively movable member is a rotatable shaft and the confronting surface of the other relatively movable member is specially shaped to form hydrodynamic fluid film pumping means for building up hydrodynamic fluid film shaft support with the magnetic fluid in the gap means during high speed rotation of the shaft, and wherein during low rotational speeds and at standstill physical support of the shaft is provided by the magnetic fluid filling the gap means between the confronting surfaces.

31. A magnetic fluid system according to claim 30, wherein the hydrodynamic fluid film pumping means formed in the confronting surfaces of the first housing portion are shaped to provide a plurality of circumferentially extending multi-lobe gaps providing a plurality of gradually increasing gap spacing regions between the rotatable shaft surfaces and the confronting surfaces of the first housing portion, said gradually increasing gap spacing regions continuously extending between a plurality of minimum gap spacing regions circumferentially spaced-apart around the shaft and terminating in a plurality of maximum gap spacing regions immediately adjacent the next circumferentially spaced-apart minimum gap spacing region, and wherein there are two separate partially magnetized conduits extending from the magnetic fluid in said reservoir one of which conduits extend to a narror gap spacing region, with the other conduit extending to a maximum gap spacing region.

32. A magnetic fluid system according to claim 30, wherein the fluid film pumping means formed in the confronting surfaces of the first housing portion are shaped to provide a plurality of circumferentially extending narrow gap regions interspersed between a plurality of wide gap regions to provide a hybrid hydrodynamic-hydrostatic step bearing support for the rotatable shaft extending around its circumference during high speed rotation of the shaft.

33. A magnetic fluid shaft system according to claim 30, wherein the magnetic fluid using device comprises a magnetic fluid thrust bearing comprised by an annular collar of ferromagnetic material secured to and rotatable with the rotatable shaft and comprising a part of the magnetic circuit which further includes a first housing portion and the means for producing the magnetic field, said annular collar being rotatably supported within a set of opposed spaced-apart fixed annular thrust bearing face members secured within the first housing portion and surrounding the rotatable shaft on either side of the annular collar, said fixed annual face members having relatively flat fixed thrust bearing surfaces formed thereon which are spaced-apart from and confronting coacting annular flat thrust bearing surfaces formed on the respective side surfaces of the annular collar, said fixed annular face members being fabricated from ferromagnetic material and comprising a part of the magnetic circuit with the rotatable annular collar, and the spaces between the respective side surfaces of the annular collar and the opposed spaced-apart fixed annular pole piece thrust bearing surfaces forming a gap means containing magnetic fluid supplied from said reservoir.

34. A magnetic fluid system according to claim 33, wherein the flat thrust bearing surfaces on the fixed annular pole pieces have a series of spiral grooves formed in the surface thereof in an annular ring about the circumference of the annular face members which coact with the opposing flat thrust bearing surfaces on the sides of the collar to form hydrodynamic fluid film thrust bearings during high speed rotation of the shaft and wherein openings are provided in the spiral grooves which are connected with conduits also interconnected with the reservoir for returning magnetic fluid to the reservoir under increased pressure during high speed rotation of the shaft, and wherein during low speed rotation of the shaft and at standstill the device operates as a magnetic fluid film thrust bearing.

35. A magnetic fluid system according to claim 33, wherein the flat thrust bearing surfaces on the fixed annular pole pieces have a plurality of alternate stepped land and grooved pocket surfaces formed in a ring around the surface thereof which coact with the bearing surfaces on the sides of the annular collar to form a hybrid hydrodynamic-hydrostatic fluid film thrust bearing with the magnetic fluid during high speed rotation of the shaft, and wherein during low speed rotation of the shaft and at standstill the device operates as a magnetic fluid film thrust bearing.

* * * * *